United States Patent [19]

Schoeley et al.

[11] Patent Number: 5,973,057
[45] Date of Patent: Oct. 26, 1999

[54] PROCESS FOR DEAGGREGATING SILICIC ACID

[75] Inventors: Peter Schoeley, Nunchritz; Ralf Winkler, Radebeul; Harald Schickmann, Meissen, all of Germany

[73] Assignee: Huels Silicone GmbH, Nuenchritz, Germany

[21] Appl. No.: 08/995,989

[22] Filed: Dec. 22, 1997

[30] Foreign Application Priority Data

Dec. 21, 1996 [DE] Germany .................... 196 53 992

[51] Int. Cl.⁶ ........................................ C08K 3/00
[52] U.S. Cl. .................. 524/492; 241/15; 241/16; 241/27; 423/325; 423/335; 524/493; 524/442
[58] Field of Search ............................. 423/325, 335; 524/442, 492, 493; 241/15, 16, 27

[56] References Cited

FOREIGN PATENT DOCUMENTS

| | | |
|---|---|---|
| 0 462 032 A1 | 12/1991 | European Pat. Off. . |
| 0 622 334 A1 | 11/1994 | European Pat. Off. . |
| 0 622 421 A2 | 11/1994 | European Pat. Off. . |
| 2 320 324 | 3/1977 | France . |
| 25 35 344 A1 | 2/1977 | Germany . |
| 44 42 871 A1 | 6/1995 | Germany . |
| 195 07 878 A1 | 9/1995 | Germany . |
| 2 284 609 | 6/1995 | United Kingdom . |
| 2 287 248 | 9/1995 | United Kingdom . |

OTHER PUBLICATIONS

Degussa: Schriftenreihe Pigmented NR 11 (Pigment Publication Series No. 11), 1993, p. 26.

*Primary Examiner*—Edward J. Cain
*Attorney, Agent, or Firm*—Oblon, Spivak, McClelland, Maier & Neustadt, P.C.

[57] ABSTRACT

Deaggregated highly disperse silicic acid, in which the average particle size is less than 100 nm, preferably less than 50 nm, is prepared by extremely high mechanical stress. The deaggregated silicic acid is employed as a filler in silicone rubber mixtures.

20 Claims, No Drawings

PROCESS FOR DEAGGREGATING SILICIC ACID

BACKGROUND OF THE INVENTION

1. Field of the Invention

The invention relates to a process for deaggregating highly disperse silicic acid in which average particle sizes of less than 100 nm, preferably less than 50 nm, are achieved by exposure to extremely high mechanical stress. The deaggregated silicic acid may be employed as a filler in silicon rubber mixtures.

2. Description of the Background

Diverse possible uses are known for highly disperse silicic acids prepared by pyrogenic or wet chemical processes. A main field of use is to employ these products as so-called reinforcing or active fillers in silicone rubber mixtures. These silicone rubber mixtures essentially comprise polydimethysiloxanes which have a sufficient number of reactive groups in order to convert the silicone rubber mixture into a rubber-elastic state with the aid of crosslinking substances and, if appropriate, catalysts, and the pyrogenic silicic acids mentioned, which usually have BET surface areas of at least 50 m$^2$/g. Depending on the nature of the crosslinking, a distinction is made, for example, between 1- or 2-component systems which crosslink at room temperature (RTV1, RTV2) and systems which crosslink at high temperature (HTV).

Regardless of the nature of the crosslinking, the properties of the products of all the systems are also determined decisively by the silicic acid employed. In addition to the size of the specific surface area of the silicic acid, above all the surface treatment of the silicic acid and the distribution of the silicic acid in the polysiloxane matrix are of import for the product characteristic values, both of the non-crosslinked silicone rubber mixture and of the finished elastomer.

The size of the silicic acid surface can be varied during the preparation of the mixture only within narrow limits. In contrast, the surface treatment of the silicic acid can be carried out to a varying intensity both during and after its incorporation into the polysiloxane. During this process, Si—OH groups bonded on the silicic acid, which otherwise have the effect of stiffening the silicone rubber mixture, are blocked chemically. The so-called in Situ hydrophobization is carried out with a reactive organosilicon compound, usually with hexamethyldisilazane.

In addition, the distribution of the silicic acid can be greatly influenced. Highly disperse silicic acids have a specific structure (Degussa: Schriftenreihe Pigmented NR. 11 [Pigment Publication Series No. 11], 1993, page 26). The primary particles having a size of between 7 nm and 40 nm, and are agglomerated into aggregates, which in turn join together to form even larger structures, agglomerates.

To achieve product properties which represent a combination of the best possible flow properties of the non-crosslinked silicone rubber and at the same time high mechanical strength of the crosslinked silicone rubber, such as is necessary, for example, in two-component systems employed as impression materials, the structure of the silicic acid must be broken down as far as possible. Small particle sizes, as far as possible primary particles, are aimed for in the rubber. As is known, larger structures are broken down by introducing shear energy, by subjecting the mixture of polysiloxane and silicic acid to greater or lesser mechanical stress.

German Patent Application DE 25 35 334 describes a process for homogeneous distribution of highly disperse fillers into polysiloxanes. In this process, the filler is hydrophobized in situ during mixing into the polymer, and the mixture is then subjected to a mechanical treatment. Although the silicone rubber mixtures prepared by this process are storage-stable, they do not have the properties required for impression materials because of inadequate breakdown of the agglomerated silicic acid particles.

A Drais mixer with the smallest possible gap width is described in DE 195 07 878 as a special mixing unit for effective introduction of shear energy. The average particle size which can be achieved is 100 to 200 nm. In this process also, the filler is hydrophobized in situ.

An extrudable material comprising polymer and filler is described in DE 44 42 871. For this material, 33 to about 65% by weight of filler is combined with a polymer under conditions of a relatively high shear action, and the components are then mixed, while maintaining the high shear forces. Particle sizes of 100 to 200 nm are obtained.

Another possibility of achieving small silicic particles is described in EP 622 334. In this case, pyrogenic silicic acid is obtained immediately with a particle size between 40 and 200 nm in a special process by combustion of a chlorosilane in a mixture of oxygen, hydrogen and, if appropriate, nitrogen. The silicic acid obtained is then employed for the preparation of silicone rubber mixtures without a further change in its structure, and hydrophobized in situ (EP 622 421).

No processes are described for deaggregation of aggregated and agglomerated highly disperse silicic acid in silicone rubber mixtures in which the silicic acid in the mixture finally has average particle sizes of less than 100 nm, down to the primary grain.

SUMMARY OF THE INVENTION

An object of the invention is a process which enables highly disperse silicic acids to be used completely independently of their starting structures, and for the silicic acid to be deaggregated down to particle sizes of less than 100 nm and employed as a filler for silicone rubber mixtures.

Another object of the invention is a silicone rubber mixture containing this deaggregated silicic acid.

These objects are achieved by a process for deaggregating silicic acid, comprising subjecting a mixture of highly disperse hydrophilic and/or hydrophobic silicic acid (a), and at least one organosilicon compound (b) which is liquid under normal conditions and is reactive and/or non-reactive in respect to the highly disperse silicic acid, to mechanical stress at a temperature in the range from 20 to 200° C. and a pressure which is sufficient to maintain the original constituents of the mixture in the liquid phase, in a closed mixing unit which has no dead space and has at least one rotating mixing organ, under speeds of rotation of greater than 3 m/s, preferably greater than 5 m/s, until an average particle size of less than 100 nm is achieved.

The invention also includes a silicone rubber mixture comprising polysiloxane and deaggregated silicic acid having a particle size of less than 100 nm, preferably less than 50 nm.

DETAILED DESCRIPTION OF THE INVENTION

The silicic acid (a) is preferably contained in the total mixture of (a) and (b) to the extent of at least 50% by weight.

The silicone rubber mixtures according to the invention may furthermore comprise, in addition to polysiloxane and deaggregated silicic acid, known and customary constituents, such as crosslinking agents, plasticizers, catalysts, adhesion promoters, pigments, compounds having a reinforcing action, such as MQ silicone resins, and other active or inactive fillers.

All the known commercially available pyrogenic and/or precipitated hydrophilic and/or hydrophobic silicic acids, which may optionally also contain water, may be used as the silicic acid. Hydrophilic pyrogenic silicic acids having a BET surface area greater than 50 $m^2/g$ are preferred.

Before being subjected to mechanical stress, the mixture of (a) and (b) may have a consistency which is not free-flowing, but still plastic. The viscosity of the mixture depends on the amount and viscosity of the organosilicon compounds used and the proportion of silicic acid. At viscosities below 500 Pas, a longer period and/or considerably higher speeds of rotation are usually also not sufficient for the deaggregation. It is advantageous to employ the organosilicon compound (b) at least in an amount such that the silicic acid particles are wetted.

The organosilicon compounds (b) which are liquid under normal conditions usually contain 1 to 10,000 Si atoms, preferably 1 to 5000 Si atoms, and are differentiated in respect to their reactivity toward the highly disperse silicic acid.

Compounds which are reactive with respect to silicic acid are capable of bonding the OH groups present on the surface of the silicic acid and are called treatment or hydrophobizing agents. Organosilicon compounds having 1 to 2 Si atoms, for example silazanes, such as hexamethyldisilazane, or trialkysilanols, for example trimethylsilanol, are preferably used. If silazanes are used, it is customary to work in the presence of water if the moisture adhering to the silicic acid is not sufficient. If silanols are used, it is favorable to add silazanes or an $NH_3$/water mixture. Short-chain siloxanes having up to 10 Si atoms and alkoxy, acetoxy, chlorine and/or hydroxyl groups can furthermore be employed as reactive compounds. If hydrophilic silicic acid is used specifically, it is advantageous to employ a treatment agent during the exposure to mechanical stress.

Organosilicon compounds which are non-reactive with respect to silicic acid can be differentiated in respect to their ability to participate in crosslinking reactions in silicone rubber systems. Organosilicon compounds which are used in the customary crosslinking systems for the preparation of silicone rubber systems are polyorganosiloxanes, linear and/or branched, in which up to 5 mol % of the organo radicals are crosslinkable groups. Preferably, the polyorganosiloxanes have more than 50 Si atoms and viscosities of between 1 and 100 Pas. Examples of groups having a crosslinking action are dimethylhydroxysiloxy and dialkoxymethylsiloxy end groups in condensation-crosslinking systems; dimethylvinylsiloxy and/or hydrogen end groups and/or hydrogen and/or vinyl side groups in addition-crosslinking systems; or vinyl groups in peroxidically crosslinking systems. Methyl, phenyl and/or trifluoropropyl radicals, inter alia, can be bonded as further groups which do not have a crosslinking action. Liquid siloxanes which, in addition to di- and monofunctional siloxy units, also contain tri- and tetrafunctional units, are employed as branched polyorganosiloxanes. The ratio of tri- and tetrafunctional to monofunctional groups is usually chosen such that the polymers are liquids. They are used, for example, with the aim of achieving specific flow properties in the elastomers. Mixtures of various polyorganosiloxanes can also be employed.

Organosilicon compounds (b) which contain no groups which are crosslinkable, specifically no hydrolyzable groups, and therefore groups which do not react with respect to the silicic acid surface, and which can be used are, for example, hexaalkyldisiloxanes, cyclic dialkysiloxanes having 3 to 6 Si atoms or linear siloxanes having a viscosity of between 0.05 and 1 Pas, preferably polydimethylsiloxanes containing trimethylsilyl end groups.

Mixtures of various organosilicon compounds may be employed for deaggregating the highly disperse silicic acid, and if hydrophilic silicic acid is used, it is advantageous to use a reactive organosilicon compound. Examples include mixtures of hexamethyldisilazane with polydimethylsiloxane containing hydroxyl end groups and having a viscosity of about 10 Pas, or with polydimethylsiloxane containing vinyl end groups and having viscosities of about 1 Pas to 65 Pas, or with polydimethylsiloxane containing trimethylsilyl end groups and having a viscosity of about 0.1 Pas, or with a high-viscosity polydimethylsiloxane with vinyl side groups; and mixtures of hexamethyldisiloxane with most polydimethylsiloxanes.

The deaggregation of the silicic acid may be carried out, for example, by a procedure in which 100 parts by weight of at least one polyorganosiloxane, linear and/or branched, in which up to 5 mol % of the organo radicals are crosslinkable groups and 100 to 300 parts by weight of a highly disperse silicic acid is subjected to extremely high mechanical stress in a closed mixing unit which has no dead space and at least one rotating mixing organ, under speeds of rotation of greater than 3 m/s, preferably greater than 5 m/s, at a temperature in the range from 20 to 200° C., preferably from 100 to 150° C., under a pressure of greater than 1 bar preferably 5 to 8 bar, until an average particle size of less than 100 nm, preferably less than 20 nm, is achieved. If hydrophilic silicic acid is used, 0.1 to 75 parts by weight of a reactive compound suitable for surface treatment of the silicic acid, for example a disilazane, and, if appropriate, water, are added before the incorporation of the silicic acid, the total of the parts by weight of organosilicon compound which is non-reactive with respect to silicic acid and organosilicon compound which is reactive with respect to the silicic acid and, if appropriate, water, being 100.

The process according to the invention is carried out with the aid of a mechanically operated mixing unit equipped with at least one rotating mixing organ. The deaggregation of the silicic acid (a) in the presence of an organosilicon compound (b) is carried out at elevated temperatures in a so-called positive mixing system without dead space, which means that the entire mixing chamber is filled. Preferably, the pressure in the mixing chamber is above atmospheric pressure, preferably 1 to 15 bar, more preferably 5 to 8 bar, and is calculated such that all the constituents of the mixture which are readily volatile under normal conditions also remain in the liquid phase at elevated temperatures. The rotating mixing organ operates at a speed of rotation of more than 3 m/s, preferably more than 5 m/s. The period required for the deaggregation is a few minutes to several hours, usually 5 minutes to 6 hours, and depends on the constituents of the mixture, their mixing ratio, the speed of rotation of the mixing organ and/or the particle size aimed for. In the case of a discontinuous procedure, 30 to 90 minutes is usually required, and 1 to 15 minutes is required for continuous deaggregation.

Extremely high introduction of dispersing energy into the mixture is essential for successful deaggregation of the silicic acid in organosilicon compounds. This extreme stress can be implemented in mixing units with mechanically operating mixing organs, which was completely surprising and unexpected, if the procedure is carried out according to the invention in a completely filled (no dead space) mixing chamber under elevated temperature and pressure at high speeds of rotation of the mixing organ. As a result of the simultaneous utilization of a so-called positive mixing system and a high-speed mixing organ, it is possible to deaggregate the silicic acid particles such that particle sizes of less than 100 nm, preferably less than 50 nm, can be achieved. Average particle sizes of silicic acid in silicone rubber mixtures means the average particle size of individual and/or groups of primary particles, i.e., fully separated aggregates, agglomerates and any unaggregated and unagglomerated primary particles.

A compression mixer equipped with mixing blades and a movable base plate is used as the preferred mixing unit for the process according to the invention. However, all other mixing units in which mixing can be carried out without a dead space and with which the introduction of extremely high mechanical stress is ensured are also suitable. The process according to the invention can be carried out continuously, for example, in mixing units such as a two-screw extruder.

When the desired particle size has been reached, it is advantageous to remove from the mixture readily volatile constituents which are present or have been formed by reaction. Depending on the later intended use, the mixture having a high filler content obtained by the procedure according to the invention can be either diluted with polyorganosiloxanes and/or stored as a silicone rubber mixture, or processed to the ready-cured elastomer, if appropriate after addition of further customary constituents of the mixture.

Silicone rubber mixtures which comprise the deaggregated silicic acids prepared according to the invention have a great advantage over the conventional mixtures in that they are exceptionally storage-stable and, even as mixtures having a high filler content, can be prepared with good flow properties. Furthermore, all highly disperse silicic acids can be employed in the process according to the invention, regardless of their preparation and pretreatment.

Having generally described this invention, a further understanding can be obtained by reference to certain specific examples which are provided herein for purposes of illustration only and are not intended to be limiting unless otherwise specified.

EMBODIMENT EXAMPLES

All the viscosity data are based on 25° C.

Examples 1 to 7

Polydimethylsiloxane (PDMS), water and hexamethyldisilazane were mixed with one another at room temperature in a laboratory compression mixer having a total capacity of 10 l and equipped with a reflux condenser. Commercially available, untreated pyrogenic silicic acid in Examples 1 to 6 or silicic acid treated with hexamethyldisilazane in Example 7, having a BET surface area of 300 m²/g, were mixed stepwise into this mixture. By increasing the speed of rotation of the mixing tool to 800 minute$^{-1}$ (speed of rotation 10 ms$^{-1}$), the temperature of the goods to be mixed was increased. At the same time, evolution of ammonia started. When the pressure in the mixing chamber exceeded 9 bar absolute, the ammonia gas was let down via the reflux condenser, the components which then evaporated, such as water and hexamethyldisilazane, and cleavage products thereof precipitating and being recycled back to the mixture. This mode of operation was maintained at a temperature between 100 and 140° C. for 120 minutes. Thereafter, all the volatile constituents were removed from the mixture under a pressure of 10 mbar absolute. A transparent, plastic product, which could be mixed with polysiloxane or other additives stepwise as required, was obtained.

The organosilicon compounds, silicic acids and hydrophobizing agents used as well as the amount employed and the particle sizes achieved are shown in Table 1.

Example 8

The procedure was analogous to Examples 1 to 7, with the exception that an already hydrophobized pyrogenic silicic acid having a BET surface area of 260 m²/g was used and was mixed into the polysiloxane. Even when the temperature of the goods to be mixed rose, no evolution of ammonia occurred, so that the working step of letting down ammonia could be omitted. The results are shown in Table 1.

Example 9

A twin-shaft mixing and kneading reactor of the type CRP 6 was employed as the mixing unit, the procedure being as in Examples 1 to 7. The mixing tools moved at a speed of rotation of 4.5 ms$^{-1}$. The results are shown in Table 1.

Example 10 (Comparative Example)

A planetary dissolver was used as the mixing unit. The peripheral speed of the two mixing tools was 10 ms$^{-1}$. The total amount of polysiloxane was initially introduced and mixed with hexamethyldisilazane and water, and the silicic acid was mixed in. The procedure is in accordance with the same method as in Experiments 1 to 7, but no mixing chamber without a dead space is available here.

TABLE 1

| Example No. | Type[1] | Polydimethylsiloxane Viscosity [Pas] | Amount [g] | Silicic acid [g] | Hexamethydisilane [g] | Water [g] | Average particle size[3] [nm] |
|---|---|---|---|---|---|---|---|
| 1 | A | 3.5 | 500 | 632 | 253 | 63 | 25 |
| 2 | A | 3.5 | 500 | 623[2] | 253 | 63 | 40 |
| 3 | A | 60 | 500 | 632 | 253 | 63 | 20 |
| 4 | B | 2 | 421 | 632 | 253 | 63 | 30 |
| 5 | C | 0.1 | 421 | 632 | 253 | 63 | 40 |
| 6 | D | 1 | 421 | 632 | 253 | 63 | 30 |
| 7 | E | 60000 | 1474 | 632 | 253 | 63 | 20 |
| 8 | A | 3.5 | 500 | 632 | — | — | 30 |
| 9 | A | 3.5 | 500 | 632 | 253 | 63 | 35 |
| 10 | A | 3.5 | 1896 | 632 | 253 | 63 | 220 |

TABLE 1-continued

| | Polydimethylsiloxane | | Silicic | | | |
|---|---|---|---|---|---|---|
| Example No. | Type[1] | Viscosity [Pas] | Amount [g] | acid [g] | Hexamethydisilane [g] | Water [g] | Average particle size[3] [nm] |

[1]Type A: PDMS with dimethylvinylsiloxy end groups
Type B: PDMS with dimethylhydroxy end groups
Type C: PDMS with trimethylsiloxy end groups
Type D: Mixture of Type B and Type C in a ratio of 80:20 (parts by weight)
Type E: PDMS with dimethylvinylsiloxy end groups and 0.05 mol % of methylvinylsiloxy groups
[2]Silicic acid pretreated with hexamethyidisilazane
[3]Measured by means of TEM (transmission electron microscopy)

As can be seen from the table, the production of silicic acid particles of less than 100 nm is achieved only if mixing is carried out under pressure in a mixing unit without a dead space and the speed of rotation of the mixing tool is more than 3 ms$^{-1}$.

Obviously, numerous modifications and variations of the present invention are possible in light of the above teachings. It is therefore to be understood that within the scope of the appended claims, the invention may be practiced otherwise than as specifically described herein.

The priority document of the present application, German Patent Application, DE 196 53 992, filed Dec. 21, 1996, is hereby incorporated by reference.

What is claimed as new and desired to be secured by Letters Patent of the United States is:

1. A process for deaggregating silicic acid, comprising:
   subjecting to mechanical stress a mixture comprising:
   (a) highly dispense silicic acid, and
   (b) at least one organosilicon compound which is liquid at 25 ° C. and 1 atmosphere;
   wherein said subjecting is carried out at a temperature of 20 to 200° C. in a closed mixing unit which has no dead space and has at least one rotating mixing organ rotating at a speed of greater than 3 m/s, and
   said subjecting is conducted until said silicic acid has an average particle size of less than 100 nm.

2. The process of claim 1, wherein said subjecting is conducted until said silicic acid has an average particle size of less than 50 nm.

3. The process of claim 1, wherein said mixture comprises at least 50% by weight of said silicic acid.

4. The process of claim 1, wherein said organosilicon compound contains 1 to 10,000 Si atoms.

5. The process of claim 1, wherein said organosilicon compound is at least one member selected from the group consisting of disilazanes and trialkylsilanols.

6. The process of claim 1, wherein said organosilicon compound comprises up to 10 Si atoms, and said organosilicon compound contains at least one group selected from the set consisting of alkoxy, acetoxy, chlorine and hydroxyl.

7. The process of claim 1, wherein said organosilicon compound is a polyorganosiloxane containing up to 5 mol % crosslinkable groups.

8. The process of claim 7, wherein said polyorganosiloxane has a viscosity of 1 to 100 Pas.

9. The process of claim 7, wherein said polyorganosiloxane is a linear polyorganosiloxane containing at least one group selected from the set consisting of dimethylhydroxysiloxy, dialkoxymethylsiloxy and dimethylhydrogensiloxy end groups, or dimethylvinylsiloxy, hydrogen and vinyl side groups.

10. The process of claim 1, wherein said organosilicon compound is a linear and/or cyclic organosilicon compound without crosslinkable groups.

11. The process of claim 10, wherein said organosilicon compound is selected from the group consisting of hexaalkyldisiloxanes, octaalkyltrisiloxanes and cyclic dialkylsiloxanes having 3 to 6 Si atoms.

12. The process of claim 10, wherein said organosilicon compound has a viscosity of 0.05 to 1.00 Pas.

13. The process of claim 10, wherein said highly dispersed silicic acid has a BET surface area of greater than 50 m$^2$/g.

14. A silicone rubber mixture comprising silicic acid having an average particle size of at most 100 nm.

15. The silicone rubber mixture of claim 14, wherein said silicic acid has an average particle size of at most 50 nm.

16. The silicone rubber mixture of claim 14, further comprising at least one organosilicon compound which is liquid at 25 ° C. and 1 atmosphere.

17. The process of claim 1, further comprising, after said subjecting, removing volatile constituents produced during said subjecting.

18. A silicone rubber mixture prepared by the process of claim 1.

19. A silicone rubber mixture prepared by the process of claim 7.

20. A silicone rubber mixture prepared by the process of claim 17.

* * * * *